(12) United States Patent
Motomura et al.

(10) Patent No.: US 7,011,775 B2
(45) Date of Patent: Mar. 14, 2006

(54) METHOD FOR MANUFACTURING LIQUID CRYSTAL ORIENTATION FILM, LIQUID CRYSTAL ORIENTATION FILM, OPTICAL FILM, AND VISUAL DISPLAY

(75) Inventors: Hironori Motomura, Ibaraki (JP); Ikuo Kawamoto, Ibaraki (JP); Miki Shiraogawa, Ibaraki (JP)

(73) Assignee: Nitto Denko Corporation, Ibariki (JP)

( * ) Notice: Subject to any disclaimer, the term of this patent is extended or adjusted under 35 U.S.C. 154(b) by 321 days.

(21) Appl. No.: 10/360,876

(22) Filed: Feb. 10, 2003

(65) Prior Publication Data

US 2003/0152712 A1  Aug. 14, 2003

(30) Foreign Application Priority Data

Feb. 13, 2002 (JP) .............................. 2002-035184
Mar. 5, 2002 (JP) .............................. 2002-058132

(51) Int. Cl.
*B29D 11/00* (2006.01)
(52) U.S. Cl. ....................... 264/1.34; 264/1.7
(58) Field of Classification Search ............... 264/1.34, 264/1.7, 2.6, 2.7; 428/1.1
See application file for complete search history.

(56) References Cited

U.S. PATENT DOCUMENTS 5,132,147 A    7/1992   Takiguchi et al. ....... 427/393.5

FOREIGN PATENT DOCUMENTS

| JP | 3-9325 | 1/1991 |
| JP | 11-125717 | 5/1999 |
| JP | 2001-343529 | 12/2001 |

*Primary Examiner*—Mathieu D. Vargot
(74) *Attorney, Agent, or Firm*—Westerman, Hattori, Daniels & Adrian, LLP

(57) ABSTRACT

A liquid crystal orientation film, which is formed of a liquid crystal polymer, having a satisfactory orientation property is obtained by a method for manufacturing a liquid crystal orientation film, comprising the steps; coating a polymerizable liquid crystal monomer on an orientation substrate; orienting said polymerizable liquid crystal monomer in a state of liquid crystal; polymerizing said polymerizable liquid crystal monomer to form a liquid crystal orientation layer (1); coating a liquid crystal polymer on said liquid crystal orientation layer (1); and orienting said liquid crystal polymer in a state of liquid crystal to form a liquid crystal orientation layer (2).

3 Claims, No Drawings

METHOD FOR MANUFACTURING LIQUID CRYSTAL ORIENTATION FILM, LIQUID CRYSTAL ORIENTATION FILM, OPTICAL FILM, AND VISUAL DISPLAY

BACKGROUND OF THE INVENTION

1. Field of the Invention

The present invention relates to a method for manufacturing a liquid crystal orientation film. Besides, the present invention relates to a liquid crystal orientation film obtained by the method for manufacturing concerned and an optical film using at least one liquid crystal orientation film concerned. A liquid crystal orientation film of the present invention may be used as optical films, such as retardation plate, viewing angle compensation film, optical compensation film, and elliptically polarized light film, independently or in combination with other films. Furthermore, the present invention relates to visual displays, such as liquid crystal display, organic EL display, PDP, etc. using the above described optical films.

2. Description of the Prior Art

As methods of producing a liquid crystal orientation film, a method is known until now in which liquid crystal polymer is oriented at a liquid crystal temperature range and then cooled below a glass transition temperature. Since a raw material is a liquid crystal polymer, the method for manufacturing a liquid crystal orientation film has a characteristic that high film-forming property in a state where it is processed into a coating liquid is demonstrated, and therefore satisfactory workability is assured. However, generally, orientation of liquid crystal polymers is difficult as compared with low molecular liquid crystal compounds, and durability after oriented also has large dependence on a glass transition temperature of the liquid crystal polymer, and therefore, in general, it is difficult for high durability and high orientation property to be coexistent in a liquid crystal orientation film obtained by a liquid crystal polymer.

On the other hand, as a method for producing a liquid crystal orientation film, a method is known in which a polymerizable liquid crystal monomer is polymerized and cross-linked by ultraviolet radiation etc. after it is oriented at a liquid crystal temperature range. Since a polymerizable liquid crystal monomer is a low molecular compound, it shows comparatively satisfactory orientation property. Besides, when a liquid crystal monomer with polyfunctional reaction groups therein etc. in polymerizable liquid crystal monomers is used, a feature will be realized that a film formed after polymerization and cross-linking shows a high heat resistance and high strength. However, even if film formation is tried using a liquid crystal monomer as a coating liquid, uniform film is difficult to be formed and there occurs a problem that outward appearance-faults, such as crystal deposition is easily given. Besides, problems of inferior workability that a low viscosity of coating liquid deteriorates handling may occur.

In order to uniformly orient the above described liquid crystal polymer or the polymerizable liquid crystal monomer, liquid crystal molecule is preferably oriented on an orientation substrate. As orientation substrate, a substrate on which formed an oriented thin film, such as polyvinyl alcohol and polyimide that rubbed in one direction by rayon cloth etc., and stretched orientation films, such as polyester films and polyvinyl alcohol films etc. are known. Besides, optical orientation films, such as polyvinyl cinnamates, are also known.

However, the above described orientation substrates are unnecessary in optical characteristics. Therefore, when a liquid crystal orientation film is used as an optical film of a visual display, an orientation substrate is separated and removed from a liquid crystal orientation film, in consideration of defects, such as problem of thickness, and adverse influence of an orientation substrate itself on optical characteristics. When a stretched orientation film is used as an orientation substrate, adverse influence on optical characteristics is especially greatly demonstrated.

As liquid crystal polymers used for production of a liquid crystal orientation film, since it gives easy orientation, generally a polymer having approximately 5,000 through 50,000 of weight average molecular weight is usually used. However, in many cases, a polymer having a molecular weight in this range does not give a liquid crystal orientation film with self-supporting property. Therefore, inferior workability is given when an orientation substrate is separated from the liquid crystal orientation film obtained from the liquid crystal polymer.

SUMMARY OF THE INVENTION

The object of the present invention is to provide a method for manufacturing a liquid crystal orientation film, which is formed of a liquid crystal orientation layer obtained from a liquid crystal polymer, having a satisfactory orientation property. Moreover, the object of the present invention is to provide a method for manufacturing a liquid crystal orientation film having satisfactory self-supporting property. Furthermore, the present invention aims at providing a liquid crystal orientation film obtained by the manufacturing method concerned, an optical film using the liquid crystal orientation film concerned, and a visual display using the optical film concerned.

As a result of wholehearted research performed by the present inventors in order to attain the above described purpose, it was found out that the above described subject might be solved by a method for manufacturing a liquid crystal orientation film shown hereinafter, leading to completion of the present invention.

That is, the present invention relates to a method for manufacturing a liquid crystal orientation film, comprising the steps;

coating a polymerizable liquid crystal monomer on an orientation substrate;

orienting said polymerizable liquid crystal monomer in a state of liquid crystal;

polymerizing said polymerizable liquid crystal monomer to form a liquid crystal orientation layer (1);

coating a liquid crystal polymer on said liquid crystal orientation layer (1); and orienting said liquid crystal polymer in a state of liquid crystal to form a liquid crystal orientation layer (2).

Moreover, the present invention relates to a method for manufacturing a liquid crystal orientation film comprising; separating the orientation substrate from the liquid crystal orientation film obtained by the above described manufacturing method.

In the above described manufacturing method of the present invention, since a liquid crystal orientation layer (1) by a polymerizable liquid crystal monomer is firstly formed on an orientation film prepared on the substrate, and, subsequently a liquid crystal orientation layer (2) by a liquid crystal polymer is formed thereon, thereby orientation property of a liquid crystal polymer may be improved, while efficiently employing high workability and film-forming property that are features of a liquid crystal polymer.

Moreover, a liquid crystal orientation film thus obtained is constituted with a liquid crystal orientation layer (1) formed from a liquid crystal monomer and a liquid crystal orientation layer (2) formed from a liquid crystal polymer in one body, and thus property of self-supporting film is highly demonstrated. Moreover, "a self-supporting property film being obtained" means that a film having approximately 1 cm$^2$ of area is obtained independently by this liquid crystal orientation layer, when a liquid crystal orientation film comprising a liquid crystal orientation layer having a thickness of approximately several $\mu$m (0.1 through 20 $\mu$m) is formed. If a liquid crystal orientation film has a characteristic of self-supporting property film, it becomes possible that a liquid crystal orientation film coated and formed on a certain orientation substrate may be easily transferred by pressure sensitive adhesives etc. to other films etc., leading to an easy handling. That is, this means that an orientation substrate having satisfactory separable property is realized.

In the above described method for manufacturing a liquid crystal orientation film, cholesteric liquid crystal polymers are suitable as liquid crystal polymers. Kind of a liquid crystal polymer is not especially limited, and cholesteric liquid crystal polymers are suitable for optical films.

Moreover, the present invention relates to a liquid crystal orientation film obtained by the above described manufacturing method. And, the present invention relates to an optical film comprising at least one of the above described liquid crystal orientation films. Furthermore, it relates to a visual display with the above described optical film being applied.

DESCRIPTION OF THE PREFERRED EMBODIMENTS

A liquid crystal orientation film of the present invention is manufactured by forming a liquid crystal orientation layer (1) by a polymerizable liquid crystal monomer on an orientation substrate, and subsequently by forming a liquid crystal orientation layer (2) onto the liquid crystal orientation layer (1) concerned by a liquid crystal polymer.

As a liquid crystal polymer, polymers having various skeletons, such as principal chain type, side chain type, or compound type thereof showing liquid crystal orientation property of nematic, cholesteric, or smectic property may be used without any limitation.

Principal chain type liquid crystal polymers include polymers of condensed type having a structure where mesogenic groups comprising aromatic units etc. are bonded, such as polyester based, polyamide based, polycarbonate based and polyester imide based polymers. As the above described aromatic units constituting mesogenic groups, phenyl based, biphenyl based, and naphthalene based units may be mentioned, and these aromatic units may have substituents, such as cyano groups, alkyl groups, alkoxy groups, and halogen groups.

Side chain type liquid crystal polymers include types having principal chain of polyacrylate based, polymethacrylate based, polysiloxane based, and polymalonate based chain as a skeleton, and has mesogenic groups comprising cyclic units etc. as side chains. As the above described cyclic units used as mesogenic groups, biphenyl based, phenyl benzoate based, phenylcyclohexane based, azoxybenzene based, azomethine based, azobenzene based, phenyl pyrimidine based, diphenyl acetylene based, diphenyl benzoate based, bicyclo hexane based, cyclohexylbenzene based, terphenyl based units, etc. may be mentioned. Moreover, end groups of these cyclic units may have substituents, such as cyano groups, alkyl groups, alkoxy groups, and halogen groups.

And, any mesogenic groups in a liquid crystal polymer may be bonded through spacer parts that give flexibility. As spacer parts, polymethylene chains, polyoxymethylene chains, etc. may be mentioned. A number of repetitions of structural units forming the spacer parts is suitably determined by chemical structures of mesogenic parts, and a number of repetition units of polymethylene chain is 0 through 20, and preferably 2 through 12, and a number of repetition units of polyoxymethylene chain is 0 through 10, and preferably is 1 through 3.

Moreover, cholesteric based liquid crystal polymers may be obtained by adding low molecule chiral agents to nematic based liquid crystal polymers, or by introducing chiral components into polymer components.

A molecular weight of a liquid crystal polymer is not especially limited, and approximately 2,000 through 100,000 of weight average molecular weight is preferable. Since decrease in orientation property as a liquid crystal will be shown when a weight average molecular weight of a liquid crystal polymer becomes large, a weight average molecular weight of the liquid crystal polymer is more preferably 50,000 or less. On the other side, since a tendency is shown that film-forming property as a non-fluid layer becomes inferior when a weight average molecular weight of the liquid crystal polymer becomes smaller, a weight average molecular weight of the liquid crystal polymer is more preferably 2,500 or more.

On the other hand, a polymerizable liquid crystal monomer is a liquid crystalline compound that has various skeletons showing nematic, cholesteric, or smectic liquid crystal orientation, and that has at least one of polymerizable functional group, for example, unsaturated double bonds, such as acryloyl groups, metacryloyl groups, and vinyl groups, and epoxy groups at terminal groups. In order to improve durability of a liquid crystal orientation layer (1), it is preferable to make cross-links in addition to polymerization using a polymerizable liquid crystal monomer having two or more of polymerizable functional groups. Moreover, as various skeletons showing nematic, cholesteric, or smectic liquid crystal orientation, similar examples as in liquid crystal polymers may be illustrated.

Polymerizable liquid crystal monomers usually include polymerization initiators therein. A suitable polymerization initiator is selected depending on a polymerization method of liquid crystal monomer. As a polymerization method of the polymerizable liquid crystal monomer, for example, ultraviolet radiation polymerization may be mentioned, which uses photopolymerization initiators. As photopolymerization initiators, for example, Irgacure 907, Irgacure 184, Irgacure 651, and Irgacure 369 etc. manufactured by Ciba Specialty Chemicals may be illustrated. As an amount of addition of photopolymerization initiators, an amount that does not disturb orientation property may be used in consideration of kinds of polymerizable liquid crystal monomers etc. Usually, approximately 0.5 through 30 parts by weight is preferable to polymerizable liquid crystal monomers 100 parts by weight. Especially it is preferable to use no less than 3 parts by weight.

As an orientation substrate, various kinds of conventionally known base materials for orientation may be used, and, for example, an orientation substrate formed by a method in which oriented film of thin layer comprising polyimides, polyvinyl alcohols, etc. is formed on a transparent substrate, and subsequently rubbing treatment is given, a stretched film obtained by stretching a transparent substrate, a polymer having cinnamate skeletons and azobenzene skeletons, or polyimides irradiated by polarized ultraviolet may be used.

Moreover, transparent substrates used for an orientation substrate are not especially limited, if they are substrates that do not give any change in quality at an orientation temperature of the above described mixture, and, for example, various plastic films, glass plates, metals etc. having a mono-layered structure or multi-layered structure may be used. Plastic films are not especially limited, if they are films that do not give any change at an orientation temperature, and films comprising transparent polymers, for example, polyester based polymers, such as polyethylene terephthalates and polyethylene naphthalates; cellulose based polymers, such as diacetyl celluloses and triacetyl celluloses; polycarbonate based polymers; acrylic based polymers, such as polymethylmethacrylates may be mentioned. And also, films comprising transparent polymers, for example, styrene based polymers, such as polystyrenes, and acrylonitrile styrene copolymers; olefin based polymers, such as polyethylenes, polypropylenes, polyolefins having cyclic or norbornene structure, ethylene propylene copolymers; vinyl chloride based polymers; amido based polymers, such as nylons and aromatic polyamides may be mentioned. Furthermore, films comprising transparent polymers, for example, imido based polymers, sulfone based polymers, polyether sulfone based polymers, polyether ether ketone based polymers, polyphenylene sulfide based polymers, vinyl alcohol based polymers, vinylidene chloride based polymers, vinyl butyral based polymers, allylate based polymers, polyoxymethylene based polymers, and epoxy based polymers, and mixtures of the above described polymers may also be mentioned.

In a method for manufacturing a liquid crystal orientation film of the present invention, firstly, a polymerizable liquid crystal monomer is coated on an orientation substrate, then it is oriented in a state of liquid crystal, and subsequently the liquid crystal monomer concerned is polymerized to form a liquid crystal orientation layer (1). Subsequently, a liquid crystal polymer is coated on the liquid crystal orientation layer (1) concerned, and then it is oriented in a state of liquid crystal to form a liquid crystal orientation layer (2).

As coating methods of the above described liquid crystal monomers and liquid crystal polymers, a solution coating method using a solution in which they are dissolved in solvents, or a method in which the concerned is molten, and is coated in a molten state may be mentioned, and the solution coating method is preferable among them.

Solvents used when preparing solution of the above described liquid crystal polymer and liquid crystal monomer are suitably determined depending on kinds of liquid crystal polymers and liquid crystal monomers. For example, following solvents may usually be used: halogenated hydrocarbons, such as chloroform, dichloromethane, dichloroethane, tetrachloroethane, trichloroethylene, tetrachloroethylene, and chlorobenzene; phenols, such as phenol and para-chloro phenol; aromatic hydrocarbons, such as benzene, toluene, xylene, methoxybenzene, and 1,2-dimethoxy benzene; acetone, ethyl acetate, tert-butyl alcohol, glycerol, ethylene glycol, triethylene glycol, ethylene glycol monomethyl ether, diethylene glycol dimethyl ether, ethyl cellosolve, butyl cellosolve, 2-pyrolidone, N-methyl-2-pyrrolidone, pyridine, triethylamine, tetrahydrofuran, dimethylformamide, dimethylacetamide, dimethyl sulfoxide, acetonitrile, butyronitrile, carbon disulfide, cyclohexanone. A concentration of the solution is suitably determined depending on solubility of a liquid crystal polymer and a liquid crystal monomer, and on a film thickness of a liquid crystal orientation layer (1) or (2) finally required. It is usually in a range of 3 through 50% by weight, and preferably 7 through 30% by weight.

As coating methods of the above described solution controlled to a desired concentration using the above described solvent, for example, a roll coating method, a photogravure coating method, a spin coating method, a bar coating method, etc. may be employable. Solvent is removed after coated and a liquid crystal layer is formed. Removing conditions of the solvents are not especially limited, if the solvent is removed in general and unless the liquid crystal layer does flow or fall. Usually, solvents are removed using drying at room temperature, drying by heating dryer, drying by heating on a hot plate, etc.

Orientation of a liquid crystal layer is carried out by heat treatment at a temperature at which a liquid crystal polymer or a liquid crystal monomer gives a liquid crystal state. The heat treatment temperature concerned is suitably controlled according to the liquid crystal polymer or the liquid crystal monomer. As heat treatment methods, similar methods as the above described drying methods are employable. Moreover, although it is not generally determined since it depends on a heat treatment temperature, and on the above described liquid crystal polymer or liquid crystal monomer, heat treatment period is usually selected in a range of 10 second through 2 hours, and preferably of 20 seconds through 30 minutes.

In formation of a liquid crystal orientation layer (1), a polymerizable liquid crystal monomer is polymerized after oriented. Although various means are employable as a polymerization method according to kind of a polymerizable liquid crystal monomer, for example, a photo polymerization method by optical irradiation may be employable. Optical irradiation is carried out by UV irradiation. As for UV irradiation conditions, it is preferable to adopt inert gas atmosphere for the purpose of sufficient promotion of the reaction. A high-pressure mercury ultraviolet lamp is typically used. Another kind lamps, such as meta-halide UV lamps and incandescence pipes, may also be used. Moreover, cooling processing using a cold mirror method, and water-cooling and other methods, or velocity adjustment of line velocity so that a surface temperature of the liquid crystal layer at the time of UV irradiation may be within a liquid crystal temperature suitably controls temperature.

A thickness of a liquid crystal orientation layer (1) formed of a liquid crystal monomer is not especially limited, and it is usually controlled within a range of approximately 0.05 through 10 $\mu$m and more preferably of 0.1 through 5 $\mu$m.

Moreover, a thickness of a liquid crystal orientation layer (2) formed of a liquid crystal polymer is not especially limited, and it is usually controlled within a range of approximately 1 through 20 $\mu$m, and preferably of 2 through 10 $\mu$m. The liquid crystal orientation layer (2) may be formed as one layer, and also may be as plurality of layers.

A liquid crystal orientation film comprising the above described liquid crystal orientation layer (1) and (2) may be used with the above described board, and it may be separated from the board to be used independently as an optical film. Furthermore, it may be transferred to other optical films to be used with them. The above described liquid crystal orientation film may be independently used, or may be used in combination with other films as optical films, such as retardation plates, viewing angle compensating films, optical compensating films, and elliptically polarized light films. Detailed description about them will be given hereinafter.

A polarizing plate is used as an optical film applied to visual displays, such as liquid crystal displays. The polarizing plate usually has protective film(s) on one side or both sides of a polarizer. A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. In these, a polyvinyl alcohol type film on which dichromatic materials (iodine, dyes) is absorbed and oriented after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As a material forming the protective film prepared in one side or both sides of the above-mentioned polarizer, with outstanding transparency, mechanical strength, heat stability, moisture cover property, isotropy, etc. may be preferable. As materials of the above-mentioned protective film, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers,such as polyethylene, polypropylene, polyolefin that has cyclo- type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. In addition, a film comprising resins of heat curing type or ultraviolet curing type, such as acrylics type, urethane type, acrylics urethane type and epoxy type and silicone type type may be mentioned.

Generally, thickness of the protective film is no more than 500 μm, preferably 1 to 300 μm and more preferably 5 to 200 μm.

As a transparent protection film, if polarization property and durability are taken into consideration, cellulose based polymer, such as triacetyl cellulose, is preferable, and especially triacetyl cellulose film is suitable. In addition, when transparent protection films are provided on both sides of the polarizer, transparent protection films comprising same polymer material may be used on both of a front side and a back side, and transparent protection films comprising different polymer materials etc. may be used.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

Moreover, it is preferable that the transparent protection film may have as little coloring as possible. Accordingly, a protection film having a phase difference value in a film thickness direction represented by $Rth=[(nx+ny)/2-nz] \times d$ of −90 nm through +75 nm (where, nx and ny represent principal indices of refraction in a film plane, nz represents refractive index in a film thickness direction, and d represents a film thickness) may be preferably used. Thus, coloring (optical coloring) of polarizing plate resulting from a protection film may mostly be cancelled using a protection film having a phase difference value (Rth) of −90 nm through +75 nm in a thickness direction. The phase difference value (Rth) in a thickness direction is preferably −80 nm through +60 nm, and especially preferably −70 nm through +45 nm.

The above described polarizer and the protective film are usually adhered through aqueous adhesives etc. As aqueous adhesives, polyvinyl alcohol based adhesives, gelatin based adhesives, vinyl based latex based, aqueous polyurethanes, aqueous polyesters, etc. may be illustrated.

As the opposite side of the polarizing-adhering surface above-mentioned protective film, a film with a hard coat layer and various processing aiming for antireflection, sticking prevention and diffusion or anti glare may be used.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 µm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight part to the transparent resin 100 weight part that forms the fine concavo-convex structure on the surface, and preferably 5 to 25 weight part. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective layer.

The above-mentioned polarizing plate may be used as elliptically polarizing plate or circularly polarizing plate on which the retardation plate is laminated. A description of the above-mentioned elliptically polarizing plate or circularly polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called $\lambda/4$ plate) is used. Usually, half-wavelength plate (also called $\lambda/2$ plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection.

A retardation plate may be a retardation plate that has a proper phase difference according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyallylates and polyamides; oriented films comprising liquid crystal materials, such as liquid crystal polymer; and films on which an orientation layer of a liquid crystal material is supported may be mentioned.

Moreover, a retardation plate is used as a wide visual field angle polarizing plate in which it is laminated to a polarizing plate as a viewing angle compensating film. A viewing angle compensation film is a film for extending viewing angle so that a picture may look comparatively clearly, even when it is viewed from an oblique direction not from vertical direction to a screen.

As such a viewing angle compensation retardatiton plate, in addition, bi-directionally stretched films, such as films having birefringence in which biaxial-stretching processing or stretching processing in two perpendicularly intersecting directions etc. is given, and inclined-stretched film etc. may be used for others. As inclined orientation film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. Viewing angle compensation films may be suitably combinable for the purpose of inhibition of coloring by variation of viewing angle based on retardation by a liquid crystal cell etc. and of expanding of viewing angle for satisfactory visual recognition.

Besides, a compensation plate in which an optical anisotropy layer consisting of an orientation layer of liquid crystal polymer, especially consisting of an inclined orientation layer of discotic liquid crystal polymer is supported with triacetyl cellulose film may preferably be used from a viewpoint of attaining a wide viewing angle with good visibility.

An optical layer used in practical use is especially no limitation, one layer or two layers or more of optical layers, which may be used for formation of a liquid crystal display etc., such as a reflective plate, and a transflective plate, may be used. Especially preferable polarizing plates are; a reflection type polarizing plate or a transflective type polarizing plate in which a reflective plate or a transflective reflective plate is further laminated onto a polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy (D-BEF and others manufactured by 3M Co., Ltd.); an oriented film of cholesteric liquid-crystal polymer; a film that has the characteristics of reflecting a circularly polarized light with either left-handed or right-handed rotation and transmitting other light, such as a film on which the oriented cholesteric liquid crystal layer is supported(PCF350 manufactured by NITTO DENKO CORPORATION, Transmax manufactured by Merck Co., Ltd., and others); etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

The above described elliptical polarizing plates and reflection type elliptical polarizing plate may be obtained by laminating a polarizing plate or a reflection type polarizing plate to a retardation plate in proper combination. This elliptical polarizing plate etc. may be formed by sequentially and separately laminating a polarizing plate (reflected type) and a retardation plate in a production process of a liquid crystal display so that they may give a proper combination, an optical film beforehand laminated and constituted as an elliptical polarizing plate etc. is superior in stability of quality, and laminating workability, etc., to demonstrate advantage in improved production efficiency of liquid crystal displays.

Adhesive layer may also be provided in an optical film of the present invention. A pressure sensitive adhesive layer may be used for attachment to a liquid crystal cell, and also it may be used for laminating of an optical film. On the occasion of adhesion of the above described optical film, the optical axes may be set so that a proper arrangement angle may be given according to required phase difference characteristics.

As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

Proper method may be carried out to attach an adhesive layer to one side or both sides of the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a optical film top using suitable developing methods, such as flow method and coating method, or a method in which an adhesive layer is once formed on a separator, as mentioned above, and is then transferred on a polarizing plate or an optical film may be mentioned.

An adhesive layer may also be prepared on one side or both sides of a polarizing plate or an optical film as a layer in which pressure sensitive adhesives with different composition or different kind etc. are laminated together. Moreover, when adhesive layers are prepared on both sides, adhesive layers that have different compositions, different kinds or thickness, etc. may also be used on front side and backside of a polarizing plate or an optical film. Thickness of an adhesive layer may be suitably determined depending on a purpose of usage or adhesive strength, etc., and generally is 1 to 500 $\mu$m, preferably 5 to 200 $\mu$m, and more preferably 10 to 100 $\mu$m.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, optical films and, if necessity, lighting system, and by incorporating driving circuit. In the present invention, except that an optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned optical film has been located at one side or both sides of the liquid crystal cell, and with which a backlight or a reflective plate is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, antiglare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, an organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to π/4, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to π/4, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLE

Hereinafter, constitution and effect of the present invention will be described in detail with reference to Examples shown below. Liquid crystal polymers and liquid crystal monomers used in each example are shown hereinafter. A liquid crystal temperature range of liquid crystal polymers and liquid crystal monomers is a value measured by observation using a polarization microscope with a hot plate (heating stage). In a liquid crystal polymer, (g): represents a glass transition temperature (° C.), (ch): represents a cholesteric liquid crystal temperature range, and (i): represents an isotropic phase transition temperature (° C.). In a liquid crystal monomer, (Cr): represents a crystallization temperature (° C.), (n): represents a nematic liquid crystal temperature range, and (i): represents an isotropic phase transition temperature (° C.).

Liquid crystal polymer A (g 90, ch 215, i): [formula]

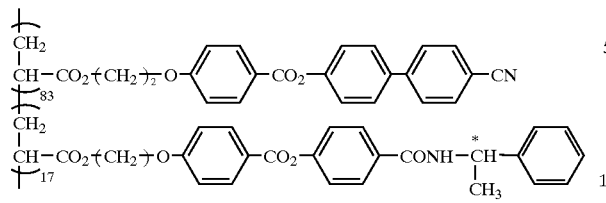

Polymerizable liquid crystal monomer B (Cr64, n116, i) [formula]

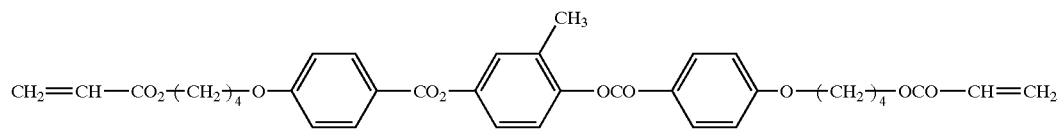

EXAMPLE 1

A toluene solution of 20% by weight of a polymerizable liquid crystal monomer B (including a photo polymerization initiator: Irgacure 907 manufactured by Ciba Specialty Chemicals is included 3% by weight to the polymerizable liquid crystal monomer B) was prepared. The above described toluene solution was coated by a bar coater on a biaxially-stretched polyethylene terephthalate film having 50-micrometer thickness as an orientation substrate, and was heated for 2 minutes and orientation processing was carried out at 80° C. Subsequently, ultraviolet radiation of 300 mJ/cm$^2$ was irradiated to polymerize and cross-link the plymerizable liquid crystal monomer B to obtain a liquid crystal orientation layer (1) having 0.5-micrometer thickness and homogeneous oriented. Subsequently, 30% by weight of cyclohexanone solution of a cholesteric liquid crystal polymer A was prepared, and then coated on the above described liquid crystal orientation layer (1) by a bar coater. Then it was heated at 150° C., for 3 minutes. In such a manner, orientation processing was carried out to form a cholesteric liquid crystal orientation layer (2) of 3-micrometer thickness, and thus a liquid crystal orientation film was obtained.

COMPARATIVE EXAMPLE 1

Except for a cholesteric liquid crystal orientation layer (2) by the cholesteric liquid crystal polymer a having been directly formed on an orientation substrate without forming a liquid crystal orientation layer (1) by the polymerizable liquid crystal monomer B in Example 1, similar steps as in Example 1 were conducted to obtain a liquid crystal orientation film.

The following evaluations were carried out for the liquid crystal orientation film obtained in Example and Comparative Example.

(Orientation): Orientation state of a liquid crystal polymer in a cholesteric liquid crystal orientation layer (2) was observed with an optical microscope. Disclination was not observed in the Example. On the other hand, approximately one disclination was confirmed at 100-micrometer interval in Comparative Example. From these results, it was confirmed that a liquid crystal polymer layer having satisfactory orientation might be obtained in a method for manufacturing of the Example rather than in the Comparative Example.

(Self-supporting property): Cellophane adhesive tape was adhered on a liquid crystal orientation layer (2) formed of a liquid crystal polymer for evaluation of self-supporting film. In the Example, a liquid crystal orientation film having a 1 cm$^2$ or more of area was able to be easily separated. On the other hand, in the Comparative Example, a liquid crystal orientation film having only 0.1 cm$^2$ or less of area could be separated.

(Separable property): Transferring of a liquid crystal orientation layer (2) formed of a liquid crystal polymer by pressure sensitive adhesive layer to a triacetyl cellulose film was carried out. In the Example, whole liquid crystal orientation layer (2) was uniformly separated at an interface of the liquid crystal orientation layer (1) and an orientation substrate, and satisfactory transferring of a liquid crystal orientation film in which the liquid crystal orientation layer (1) and the liquid crystal orientation layer (2) was laminated might be carried out. On the other hand, in the Comparative Example, only local separation of the liquid crystal orientation layer (2) could be completed.

What is claimed is:

1. A method for manufacturing a liquid crystal orientation film, comprising the steps:
    coating a polymerizable liquid crystal monomer on an orientation substrate;
    orienting said polymerizable liquid crystal monomer in a state of liquid crystal;
    polymerizing said polymerizable liquid crystal monomer to form a liquid crystal orientation layer (1);
    coating a liquid crystal polymer on said liquid crystal orientation layer (1); and
    orienting said liquid crystal polymer in a state of liquid crystal to form a liquid crystal orientation layer (2), such that a liquid crystal orientation film is formed, said liquid crystal orientation film comprising the liquid crystal orientation layer (1) and the liquid crystal orientation layer (2).

2. A method for manufacturing a liquid crystal orientation film comprising:
    separating the orientation substrate from the liquid crystal orientation film obtained by the method for manufacturing according to claim 1.

3. The method for manufacturing a liquid crystal orientation film according to claim 1,
    wherein the liquid crystal polymer is a cholesteric liquid crystal polymer.

* * * * *